US005553832A

United States Patent [19]

Zaguroli, Jr.

[11] Patent Number: 5,553,832

[45] Date of Patent: Sep. 10, 1996

[54] SAFETY DEVICE FOR AN AIR BALANCING HOIST

[75] Inventor: James Zaguroli, Jr., Drayton Plains, Mich.

[73] Assignee: Knight Industries, Inc., Auburn Hills, Mich.

[21] Appl. No.: 284,800

[22] Filed: Aug. 2, 1994

Related U.S. Application Data

[63] Continuation-in-part of Ser. No. 30,768, Mar. 12, 1993, Pat. No. 5,370,367, and a continuation-in-part of Ser. No. 260, 194, Jun. 15, 1994, abandoned.

[51] Int. Cl.[6] .............................. B66D 1/00; B66D 1/10; F16D 51/00

[52] U.S. Cl. .......................... 254/267; 188/185; 188/342; 254/331; 254/360

[58] Field of Search .................................... 254/329, 360, 254/375, 378, 268, 383, 376, 267, 331; 188/342, 184, 185

[56] References Cited

U.S. PATENT DOCUMENTS

| | | | |
|---|---|---|---|
| 2,181,359 | 11/1939 | Barrett | 254/267 |
| 2,896,912 | 7/1959 | Faugier et al. | 254/267 X |
| 3,286,989 | 11/1966 | Bangerter et al. | 254/378 X |
| 3,457,837 | 7/1969 | Powell | 254/360 X |
| 3,504,891 | 4/1970 | Ulbing | 254/329 X |
| 3,715,016 | 2/1973 | Frieder | 188/184 |
| 4,258,832 | 3/1981 | Thorp | 188/184 |
| 4,530,474 | 7/1985 | Nederman | 188/185 X |
| 4,533,026 | 8/1985 | Bernard | 188/184 |
| 4,846,313 | 7/1989 | Sharp | 254/267 X |
| 5,439,200 | 8/1995 | Braesch et al. | 254/267 |

*Primary Examiner*—Michael R. Mansen
*Attorney, Agent, or Firm*—John R. Benefiel

[57] ABSTRACT

An air balancing hoist is described having an axially movable drum reel supported on a ball nut and screw with a piston defining a pressure chamber containing regulated air pressure acting on one end of the drum reel to counter the unwinding force of a load supported on a cable wound on the drum reel. A centrifugal brake retards drum rotation when there is a sudden release of the load tending to cause too rapid wind up of the cable by the regulated air pressure applied on the piston.

1 Claim, 2 Drawing Sheets

SAFETY DEVICE FOR AN AIR BALANCING HOIST

CROSS REFERENCE TO RELATED PATENT APPLICATIONS

This is a continuation-in-part of U.S. Ser. No. 08/030,768 filed on Mar. 12, 1993, now U.S. Pat. No. 5,370,367, for a "Safety Device for an Air Balancing Hoist", and a continuation-in-part of U.S. Ser. No. 08/260,194 filed on Jun. 15, 1994.

BACKGROUND OF THE INVENTION

This invention concerns an air balancing hoist in which regulated air pressure is applied to a movable element such as a diaphragm or piston to exert an axial force on a drum reel, which is in turn fixed to a ball screw or nut which results in a wind-up torque countering the wind out torque created by a load supported on a cable wound on the drum reel. The regulated air pressure is typically set at a level to counter all but a small proportion of the weight of the load, so that the load may be easily handled normally.

Such hoists are shown in U.S. Pat. Nos. 3,260,508, 3,428,298; and 3,526,388.

A safety hazard is inherent in these designs in that if the load is suddenly lost, as by the cable snapping, the regulated air pressure will cause the drum reel to rapidly wind up, with the end of the cable being swung wildly about.

Attempts have been made to prevent this from happening by automatically reducing the applied air pressure in this event, but rapid rotation of the drum reel has usually been already started such that its momentum continues the too fast cable wind up.

Safety devices have heretofore been devised for various reel and hoist devices, as for example the devices shown in U.S. Pat. Nos. 3,311,351; 3,160,360; 4,566,375; 4,625,933; and 4,722,422. However, none has been devised for regulated air pressure, ball screw operated balancing hoists of the type described.

Accordingly, the object of the present invention is to provide a simple yet effective device for an air balancing hoist of the type using a ball screw arrangement for driving and holding a drum reel.

SUMMARY OF THE INVENTION

This object is accomplished by mounting a centrifugally actuated brake to one end of the drum reel which brake is responsive to rotation of the drum reel at a predetermined high rate corresponding to a broken cable. The brake consists of a pivotally mounted element having an asymmetric arm on one side of the pivot and an radiused engagement end surface on the opposite side of the pivot, which is rotated into the inside surface of a confining fixed cylinder by centrifugal force acting against a restraining spring. The drum reel is allowed to rotate without restraint during normal operation, but the engagement of the brake generates considerable retarding force when excessive high speed motion occurs to prevent dangerously overspeeded wind up of the cable onto the drum reel. The brake has a self energizing geometry which increases the engagement pressure after contact with the fixed cylinder internal surface. In addition, scalloped recesses are provided into which the radiused engagement surface is urged to create a positive engagement.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
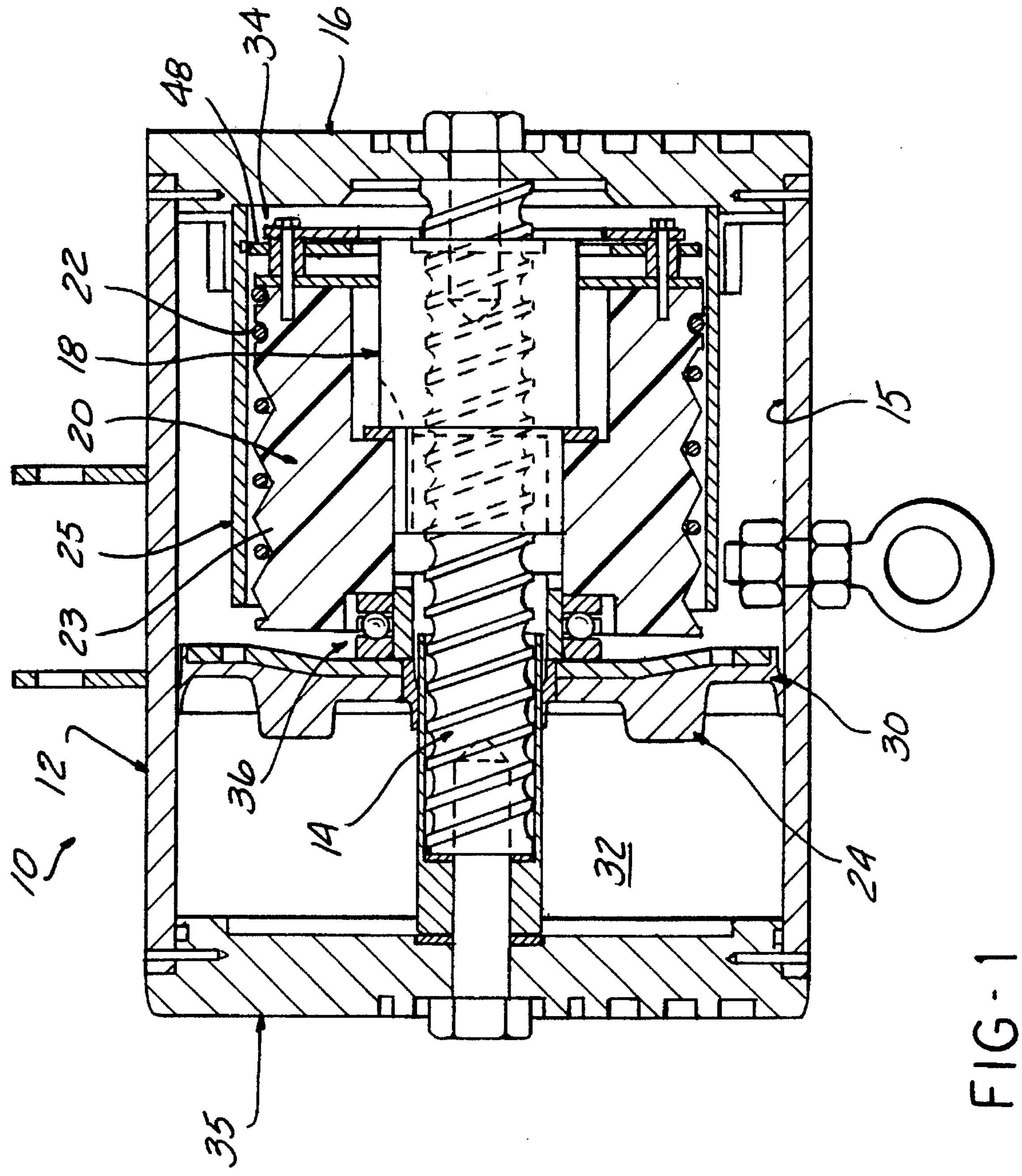
FIG. 1 is a partially sectional side view of an air balancing hoist incorporating a safety device according to the present invention.

Referring to FIG. 1, the air balancing hoist 10 includes a generally cylindrical housing 12 supported so as to be prevented from rotating, typically by an attached trolley shoe running along an overhead rail (not shown) as described in U.S. Pat. No. 3,260,508.

A ball screw 14 is fixed at one end to the right cover 16 of the housing 12, projecting to the left across the interior bore 15 in the housing 12.

A recirculating ball nut 18 is received over the ball screw 14 fixed within a drum reel 20.

The drum reel 20 has a cable 22 attached at one end to be wound into a helical groove 23 formed into the exterior of the drum reel 20 as it is rotated by the ball nut 18.

A movable element here comprised of piston 24, is slidably received in the interior bore 15 of the housing 10, having a skirt portion 30 which sealingly engages the inside of the housing 12 to define a pressure chamber 32 to the left of piston 24 and the right of end cap 35, which chamber 32 is pressurized by a source of regulated air pressure (not shown).

The piston 24 drives the left end of the drum reel 20 by engagement with an interposed thrust bearing 36.

A cable confinement sleeve 25 is fixed to the end cap 16 and receives the drum reel 20 as it moves to the left in winding the cable 22, maintaining the cable 22 in the groove 23.

Thus, the weight of a load acting on the cable 22 tends to cause the nut 18 to rotate, reacting on the stationary ball screw 14 to drive the nut 18 and drum reel to the left. This tendency is countered by the force generated on the piston 24 by regulated air pressure in chamber 32.

As described in the above referenced patents, the regulated air pressure can be set to just balance the load, or to allow only a few pounds of the weight to be unbalanced, or to drive the piston 24 to raise the load with a controller device (not shown), in the manner well known in the art.

A confining cylindrical sleeve 25 is fixed to cover 16 and surrounds the outside of the drum reel 20 to confine the cable 22.

According to the concept of the invention, an arrangement is provided for retarding rotation of the drum reel when an overspeed condition of the drum reel 20 occurs, as when the load is suddenly lost, as by the cable breaking or the load dropping loose from the cable hook.

This arrangement includes a centrifugally activated self energizing brake assembly 34 directly mounted to one end of the drum reel 20 opposite the piston 24. The brake assembly 34 includes a pair of side plates 36, 38 mounted to the end of drum reel 20 remote from the air balancer piston 24 by a pair of machine screws 40, 42 threadably received into the end of the drum reel 20. The side plates 37, 38 are held apart by a pair of spacer sleeves 44, 46 received over a respective machine screw 40, 42. An elongated braking element 48 is pivotally mounted at a point adjacent a radiused engagement end surface 50 by being received over one of the spacers 44.

A spring 52 has one end anchored to a pin 54 fixed to outer side plate 38 and the other end attached to pin 56 attached to one side of the braking element 48. Pin 56 protrudes through a notched cutout 58 to allow rotary movement about spacer 44.

The braking element 48 also has an elongated curved tail portion 60 extending from the pivot point defined by spacer 44 a much greater distance than the portion defining surface 50 so that a much greater mass is concentrated on that side of the pivot.

Figure 3:
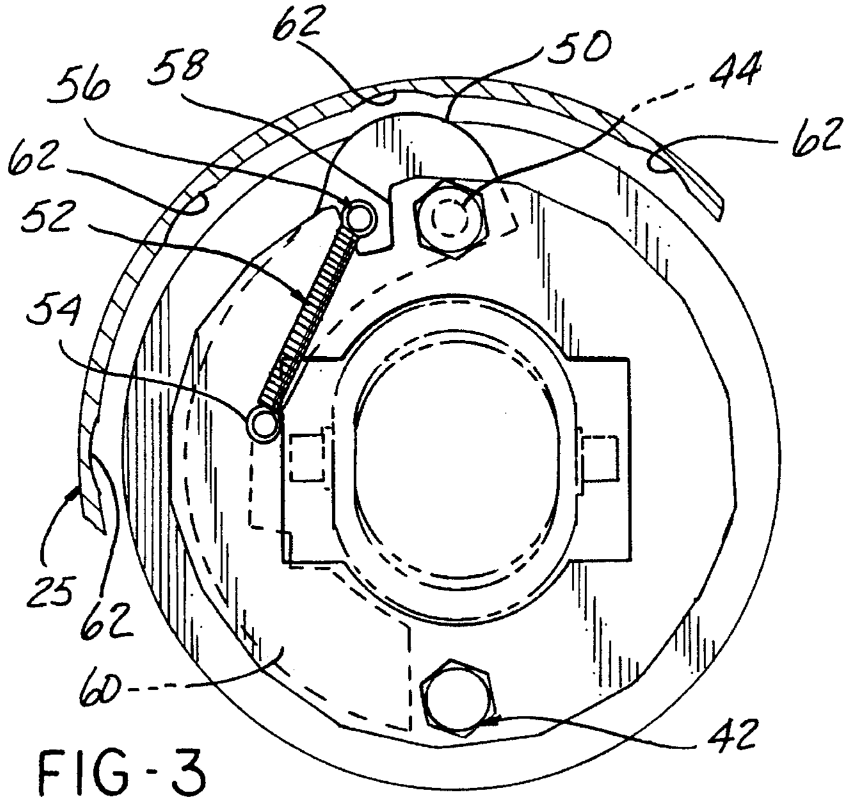
FIG. 3 is an end view of the drum reel and centrifugal brake shown in FIG. 2, with the centrifugal brake in the inactivated state.
Figure 4:
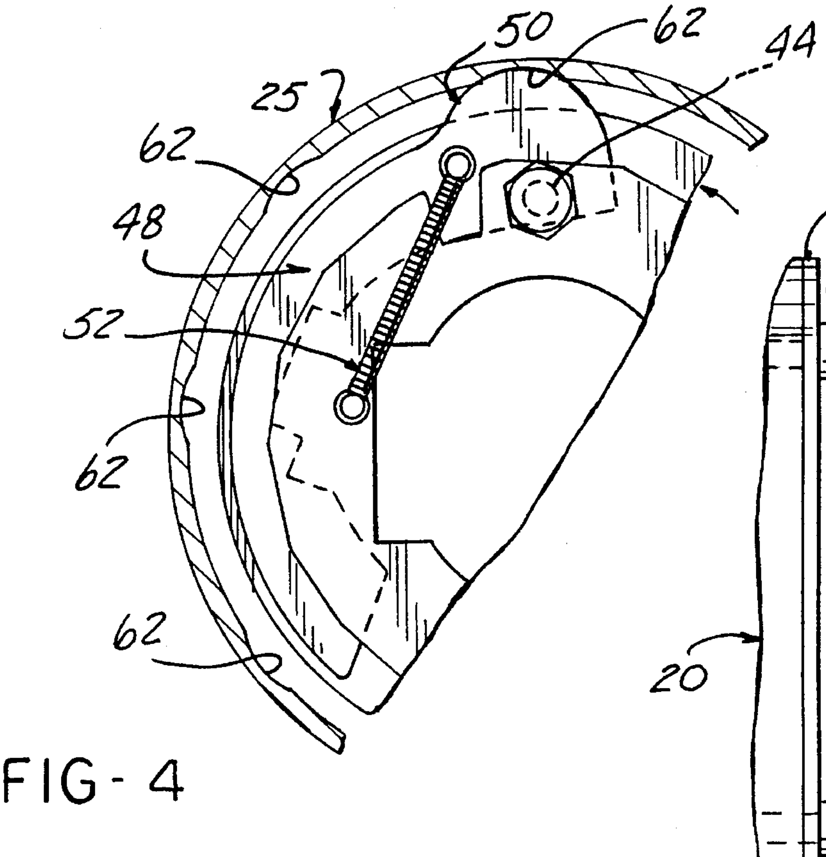
FIG. 4 is an end view of drum reel and centrifugal brake shown in the activated state engaging the inner surface of a confining cylinder shown in fragmentary form.
Figure 2:
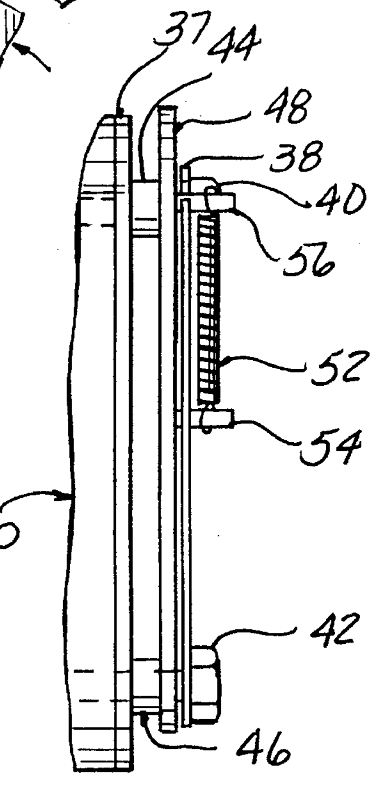
FIG. 2 is a fragmentary enlarged and rotated view of one end of the drum reel incorporated in the air balancing hoist having the centrifugal brake according to the present invention mounted thereon.

The spring 52 urges the element 48 to rotate clockwise about the pivot as viewed in FIGS. 3 and 4.

The tail portion 60 is thus urged to the radially drawn in position shown in FIG. 3.

Upon rotation of the drum reel 20 at a predetermined speed corresponding to an emergency load dropped condition, centrifugal force urges the tail portion to be swung out against the force of the spring 52.

The surface 50 is eccentric to the pivot point so as to shift successive sections thereof radially outward until contact is made with the inside of the fixed cylindrical sleeve 25.

A series of scalloped recesses 62 are provided in the inner surface of the sleeve 25 aligned with and configured to receive the end surface 50. Hence, the engagement therebetween will be rendered positive upon mating of the end surface 50 and a scalloped recess 52.

Frictional contact causes the element 48 to be driven to be further swung out to increase contact and the resulting braking force. Thus, a self energizing effect is achieved.

This prevents the drum reel 20 from being rotated at excessive speeds as a result of a sudden release of the load and the continued action of the air balancing piston 24 without any weight being supported by the cable 22.

I claim:

1. An air balancing hoist comprising:

a housing having an interior bore therein;

a ball screw mounted in said housing to extend axially through said interior bore;

a ball nut received over said ball screw;

a drum reel fixed to one of said ball nut and said ball screw to move therewith, the other of said one of said ball screw and said ball nut fixed to said housing;

a cable attached to said drum reel so as to be wound thereon and unwound therefrom upon rotation of said drum reel in either direction;

a movable element axially movable in said housing interior bore and sealed therein to define a pressure chamber on one side thereof, the other side drivingly engaging one end of said drum reel to create an axial force thereon when said chamber is pressurized;

a source of regulated air pressure in communication with said chamber applying a pressure level sufficient to at least substantially balance an axial force exerted by said cable supporting a load acting through said ball screw and nut to generate an axial force on said drum reel acting oppositely to said axial force generated by said regulated air pressure acting in said chamber;

a centrifugal brake mounted to one end of said drum reel having an element moved radially outward upon rotation of said drum reel at a predetermined rate corresponding to loss of said load on said cable;

a cylindrical fixed surface surrounding said drum reel and centrifugal brake to be engaged by said element by said radially outward movement;

said centrifugal brake element comprising an elongated arm, a pivotal support adjacent one end thereof, said arm having a radially outwardly projecting rounded end surface at said pivoted end, said arm further having a tail portion extending circumferentially away from said pivoted end, said pivot being eccentrically located with respect to said rounded surface so as to bring successive sections thereof radially outward as said tail portion moves radially outward, and wherein an inner surface of said fixed surface is formed with a series of recesses configured to be adapted to receive and interfit with said end surface upon activation of said brake by movement of said tail portion outwardly and initial frictional engagement of said rounded surface until one of said recesses becomes aligned with said rounded end surface;

whereby said centrifugal brake allows substantially unimpeded rotation of said drum reel during normal winding and unwinding of said cable thereon but substantially locks said drum reel against rotation thereof under a condition wherein said load is suddenly lost.

* * * * *